(12) United States Patent
Herman et al.

(10) Patent No.: US 10,301,108 B2
(45) Date of Patent: May 28, 2019

(54) SILO DUST COLLECTION

(71) Applicant: Quickthree Technology, LLC, Yardley, PA (US)

(72) Inventors: Alvin Herman, Saskatoon (CA); Erin Herman, Clavet (CA)

(73) Assignee: Quickthree Technology, LLC, Yardley, PA (US)

( * ) Notice: Subject to any disclaimer, the term of this patent is extended or adjusted under 35 U.S.C. 154(b) by 0 days.

(21) Appl. No.: 15/034,697

(22) PCT Filed: Nov. 11, 2014

(86) PCT No.: PCT/CA2014/000811
§ 371 (c)(1),
(2) Date: May 5, 2016

(87) PCT Pub. No.: WO2015/070326
PCT Pub. Date: May 21, 2015

(65) Prior Publication Data
US 2016/0264354 A1    Sep. 15, 2016

(51) Int. Cl.
*B65G 65/40*   (2006.01)
*B65D 90/54*   (2006.01)
*B65G 65/34*   (2006.01)
*B65D 88/26*   (2006.01)
(Continued)

(52) U.S. Cl.
CPC ......... *B65D 90/54* (2013.01); *B01D 46/0004* (2013.01); *B01D 46/0041* (2013.01);
(Continued)

(58) Field of Classification Search
CPC . B65G 53/60; B65G 53/28; B65G 2814/0319

USPC .......................................................... 414/291
See application file for complete search history.

(56) References Cited

U.S. PATENT DOCUMENTS

| | | | |
|---|---|---|---|
| 3,251,292 A | | 5/1966 | Vaughan |
| 4,345,842 A | * | 8/1982 | Peschl ...................... B01F 5/24 222/1 |

(Continued)

FOREIGN PATENT DOCUMENTS

| | | |
|---|---|---|
| CN | 201538593 U | 8/2010 |
| CN | 203402539 U | 1/2014 |

(Continued)

OTHER PUBLICATIONS

Machine translation of FR2518970 from espacenet. (Year: 1983).*
(Continued)

*Primary Examiner* — Mark C Hageman
(74) *Attorney, Agent, or Firm* — Sheehan Phinney Bass & Green PA

(57) ABSTRACT

Granular material flows out through the discharge opening of a silo and through a sealed housing to a target location. A vent opening in a top portion of the silo has a vent cover operative to selectively open and close the vent opening. When the vent cover is closed, air movement into an upper portion of the silo is prevented. A gate is operative to control a flow of granular material through the discharge opening. A vacuum conduit has a lower input end thereof connected to an interior of the housing, and an upper output end thereof located in an upper portion of an interior of the silo. Material flowing out of the silo creates a vacuum drawing dust from the housing up the vacuum conduit into the silo.

6 Claims, 3 Drawing Sheets

(51) Int. Cl.
  *B65D 88/54* (2006.01)
  *B65D 90/34* (2006.01)
  *B01D 46/00* (2006.01)
  *B65D 83/06* (2006.01)

(52) U.S. Cl.
  CPC ............ *B65D 83/06* (2013.01); *B65D 88/26* (2013.01); *B65D 88/548* (2013.01); *B65D 90/34* (2013.01); *B65G 65/34* (2013.01); *B65G 65/40* (2013.01); *B65D 2205/02* (2013.01); *B65D 2590/54* (2013.01); *B65G 2814/0319* (2013.01)

(56) References Cited

U.S. PATENT DOCUMENTS

| | | | | |
|---|---|---|---|---|
| 4,408,889 A | * | 10/1983 | Peschl | B01F 5/24 222/199 |
| 4,727,913 A | * | 3/1988 | Bliss | B65G 69/182 141/286 |
| 8,926,907 B2 | * | 1/2015 | Albin | B01J 8/0015 406/122 |
| 2011/0280769 A1 | * | 11/2011 | Yaluris | B01J 8/0015 422/119 |

FOREIGN PATENT DOCUMENTS

| FR | 2518970 A1 | 7/1983 |
|---|---|---|
| GB | 2440401 A | 1/2008 |

OTHER PUBLICATIONS

Machine translation of CN201538593 from espacenet. (Year: 2010).*
International Search Report and Written opinion for PCT App. No. PCT/CA2014/000811 dated Feb. 19, 2015, 8 pgs.

* cited by examiner

SILO DUST COLLECTION

CROSS-REFERENCE TO RELATED APPLICATION(S)

The present application is a national stage entry of PCT Patent Application No. PCT/CA14/00811, entitled SILO DUST COLLECTION, which was filed on Nov. 10, 2014.

FIELD OF THE INVENTION

This disclosure relates to the field of granular material storage facilities and in particular dust collection for storage silos.

BACKGROUND OF THE INVENTION

Silos are commonly used for storing granular material such as sand, cement, salt, fertilizer, and the like. The silos may be installed at a permanent site such as a concrete plant or the like, but often it is desired to store granular material at temporary work sites such as oil wells and the like. Portable storage silos are well known in various industries for temporary on-site storage of various granular materials. The empty silos are transported to a work site and supported suitably to accommodate the weight of the granular material being stored, and then the silo filled with granular material.

These silos are commonly oriented vertically to maximize the quantity of material stored above a hoppered bottom such that the dry material will flow out by gravity through a discharge opening with a gate that can be opened or closed to control flow out of the silo. Portable silos are often transported to the work site in a lowered horizontal transport orientation, and then raised to a vertical working orientation at the work site for similar reasons.

It is common for such storage silos, permanent or portable, to include a loading conduit to allow connection to discharge pipes of a pneumatic conveyor on a transport vehicle such that granular material can be conveyed into the silo by the pneumatic conveyor. Such pneumatic conveyors typically comprise a blower operative to create an air stream in a conveyor pipe connected to a storage vessel on the transport vehicle to receive a flow of granular material that mixes with the air stream and is carried along the conveyor pipe to an output end thereof A lower input end of the loading conduit is connected to the output end of the conveyor pipe, and the air stream and granular material mixed therein move through the loading conduit to a discharge end of the loading conduit located in an upper portion of the storage silo where the granular material falls out of the air stream into the silo. The top of the silo includes vents to allow the air stream entering the silo to escape.

When transferring granular material into such silos a considerable amount of dust is often generated, depending on the nature of the granular material. This dust has conventionally simply been vented out into the atmosphere with the air stream however more recently it has been recognized that the dust presents a health hazard to workers at the site, and efforts have been made to control the dust by filtering the escaping air stream.

Dust similarly is generated when the granular material flows out of the discharge opening. The granular material often discharges through a chute which directs the material into a conveyor or like target location. The flow of granular material along the chute, and the granular material landing on the target location generate considerable dust as well.

Granular material is often drawn out of these silos at high rates, for example 500 or more cubic feet per minute, such that when drawing material out of the silo air passes from the atmosphere through the vents into the silo at a rate substantially the same as the rate of material removal.

SUMMARY OF THE INVENTION

The present disclosure provides a granular material storage silo system that overcomes problems in the prior art.

In a first embodiment the present disclosure provides a granular material storage silo apparatus comprising a silo with a discharge opening at a bottom portion thereof configured such that granular material flows out through the discharge opening and through a sealed housing to a target location. A vent opening in a top portion of the silo has a vent cover operative to selectively open and close the vent opening. When the vent cover is closed, air movement into an upper portion of the silo is prevented. A gate is operative to control a flow of granular material through the discharge opening. A vacuum conduit has a lower input end thereof connected to an interior of the housing, and an upper output end thereof located in an upper portion of an interior of the silo.

In a second embodiment the present disclosure provides a kit for collecting dust when removing granular material from a silo with a discharge opening at a bottom portion thereof configured such that granular material flows out through the discharge opening to a target location, and with a loading conduit mounted to the silo with a lower input end located at a lower location on an exterior of the silo and an upper output end located in an upper portion of an interior of the silo. The kit comprises a sealed housing enclosing a flow path between the discharge opening and the target location, a dust conduit connected at an input end thereof to an interior of the housing, and connectable at an output end thereof to the lower input end of the loading conduit, and vent covers operative to close vent openings in an upper portion of the silo and prevent air movement into the upper portion of the silo.

In a third embodiment the present disclosure provides a method of collecting dust when removing granular material from a silo with a vent opening in an upper portion of the silo and a discharge opening at a bottom portion of the silo configured such that granular material in the silo flows out through the discharge opening to a target location. The method comprises enclosing a flow path between the discharge opening and the target location with a sealed housing; connecting a vacuum conduit at an input end thereof to an interior of the housing, and locating an upper output end of the vacuum conduit in an upper portion of an interior of the silo; closing the vent opening to prevent air movement into the upper portion of the silo above the granular material in the silo; operating a gate to release a flow of granular material through the discharge opening such that granular material flowing out the discharge opening creates a vacuum in the upper portion of the silo above the granular material therein and draws air and dust from the housing into the vacuum conduit and through the vacuum conduit into the upper portion of the silo.

In the present disclosure, dust is collected when removing granular material from a silo by using the vacuum created when granular material is drawn out of the silo to draw air and dust out of the housing enclosing the granular material flow and transfer the dust back into the silo through a vacuum conduit. The loading conduit that is commonly installed on granular material storage silos can conveniently provide a large part of the vacuum conduit. It is common for granular material to be drawn out of such silos at fairly high rates requiring the replacement in the silo above the granular material therein of a similar rate of air, thus creating an air stream sufficient to draw dust out of the sealed housing. The air stream flow can be increased by adding an exhaust fan to draw more air out of the silo above the granular material.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE INVENTION

Figure 1:
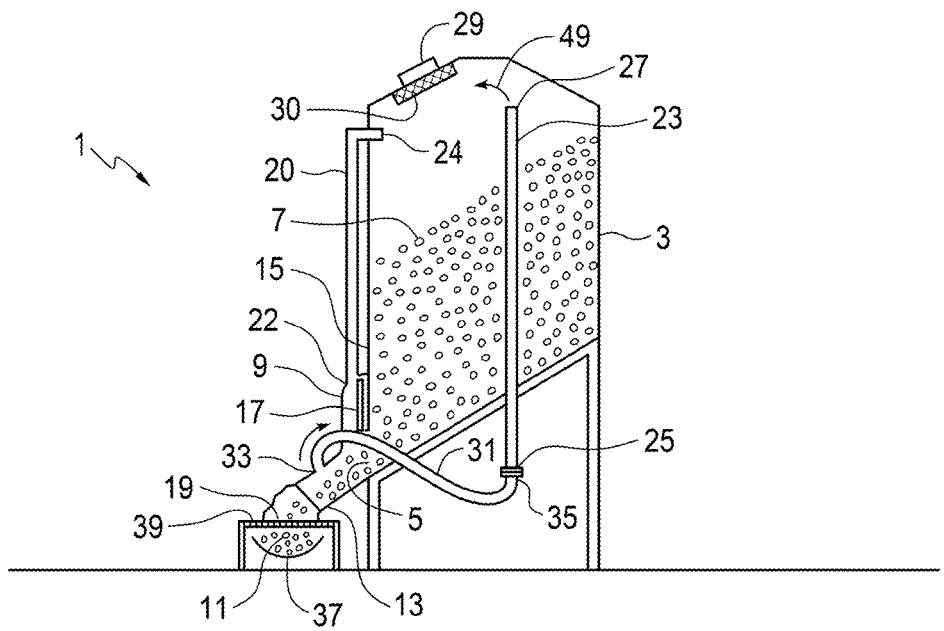
FIG. 1 is a schematic cut-away side view of an embodiment of a granular material storage silo apparatus of the present disclosure with granular material being removed from the silo.
Figure 2:
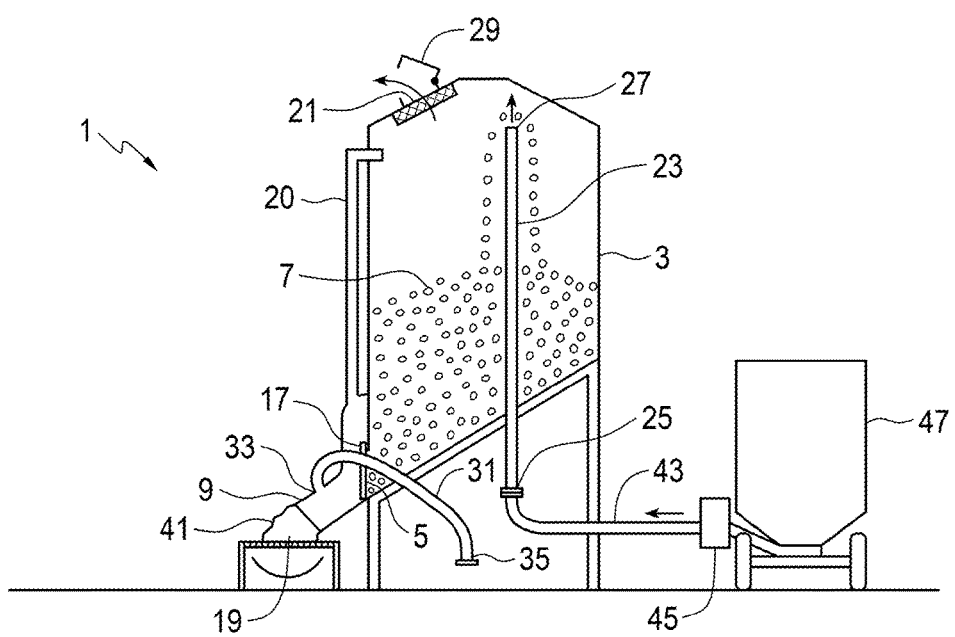
FIG. 2 is a schematic cut-away side view of the embodiment of FIG. 1 with granular material being transferred from a transport vehicle into the silo.

FIGS. 1 and 2 schematically illustrate an embodiment of a granular material storage silo apparatus 1 of the present disclosure. In FIG. 1 granular material is being removed from the silo 3 of the apparatus 1, and in FIG. 2 granular material is being loaded into the silo 3.

The apparatus 1 comprises a silo 3 with a discharge opening 5 at a bottom portion thereof configured such that granular material 7 flows out through the discharge opening 5 and through a sealed housing 9 to a target location 11. In the illustrated apparatus 1 the housing 9 has a floor 13 sloped such that the granular material 7 flows along the sloped floor 13, and the housing 9 is sealed to the silo wall 15 over the gate 17 that controls flow of granular material 7 through the discharge opening 5 such that no air can enter the housing 9 except though the output end 19 of the housing 9.

The illustrated silo 3 is a typical silo with a vent opening 21 defined in a top portion of the silo 3, and a loading conduit 23 with a lower input end 25 located at a lower location on an exterior of the silo 3 and configured to be attached to a pneumatic conveyor output, and an upper output end 27 located in an upper portion of an interior of the silo 3.

A vent cover 29 is operative to selectively open and close the vent opening 21. When the vent cover 29 is closed, as seen in FIG. 1, air movement into the upper portion of the silo 3 is prevented. A filter 30 also covers the vent opening 21, such that dust is removed from air leaving the vent when the cover 29 is open.

To draw dust out of the housing 9 a vacuum conduit, illustrated as an exterior pipe 20, has a lower input end 22 thereof connected to an interior of the housing 9, and an upper output end 24 thereof located in an upper portion of an interior of the silo 3. The pipe 20 could be on the interior of the silo as well if desired. The vacuum conduit can thus be provided as schematically illustrated in FIGS. 1 and 2 simply by installing a separate conduit 20 on the silo 3 connecting the interior of the housing 9 to the upper interior of the silo 3. A valve or cap may be provided to close the pipe 20 to prevent movement of air therethrough. As granular material is drawn out of the silo 3, a vacuum will be created in the upper portion of the silo 3 above the granular material and air and dust will be drawn from the housing 9 through the vacuum conduit into the silo 3.

It may, however, often be more convenient and economical to use the loading conduit 23, which is commonly available on silos for transferring granular material from a transport vehicle into the silo with a pneumatic conveyor, to form a portion of the vacuum conduit, so that only a shorter dust conduit 31 is required to complete the vacuum conduit.

In the apparatus 1 of FIGS. 1 and 2 the dust conduit 31 is connected at an input end 33 thereof to an interior of the housing 9. The input end 33 is connected to the interior of the housing 9 at a location above granular material 7 flowing along the sloped floor 13. The dust conduit 31 is connectable at an output end 35 thereof to a lower portion of the loading conduit 23 and when the output end 35 of the dust conduit 31 is connected to the loading conduit, the lower input end 25 of the loading conduit 23 is sealed such that no air can enter through the lower input end. The vacuum conduit is thus conveniently provided by the dust conduit 31 and loading conduit 23 connected together to form the required conduit path between the interior of the housing 9 and the upper portion of the interior of the silo 3.

Connecting the output end 35 of the dust conduit to a lower portion of the loading conduit 23 and sealing the lower input end 25 of the loading conduit 23 may be accomplished in a variety of ways. In the illustrated apparatus 1, the output end 35 of the dust conduit 31 is simply connected directly to the lower input end 25 of the loading conduit 23 such that the connection is made and the lower input end 25 of the loading conduit 27 is sealed by the output end 35 of the dust conduit 31.

In the apparatus 1 illustrated in FIGS. 1 and 2 the target location is illustrated as a belt conveyor 37 with a grate 39 over the top thereof. The housing 9 includes a flexible fabric portion 41 at the output end thereof which maintains the enclosure of the stream of granular material 7 flowing from the discharge opening 5, as schematically illustrated in FIG. 1, until the granular material 7 falls through the grate 39 onto the conveyor 37.

The present disclosure thus provides a method of collecting dust when removing granular material 7 from a silo 3 with a discharge opening 5 at a bottom portion thereof configured such that granular material 7 flows out through the discharge opening 5 to a target location 11, and with a loading conduit 23 mounted to the silo with a lower input end 25 located at a lower location on an exterior of the silo 3 and an upper output end 27 located in an upper portion of an interior of the silo 3. The method comprises enclosing a flow path between the discharge opening and the target location with a sealed housing 9; connecting a vacuum conduit, such as pipe 20 at an input end 22 thereof to an interior of the housing 9, and locating an upper output end 24 of the vacuum conduit pipe 20 in an upper portion of an interior of the silo 3; closing the vent opening 21 to prevent air movement into the upper portion of the silo 3 above the granular material 7 in the silo 3; operating a gate 17 to release a flow of granular material 7 through the discharge opening 5 such that granular material 7 flowing out the discharge opening creates a vacuum in the upper portion of the silo 7 above the granular material 7 therein and draws air and dust from the housing 9 into the vacuum conduit pipe 20 and through the vacuum conduit pipe 20 into the upper portion of the silo 3.

Instead of adding a pipe 20, the vacuum conduit can be conveniently provided by connecting a dust conduit 31 at an input end 33 thereof to an interior of the housing 9 and connecting the output end 35 of the dust conduit 31 to a lower portion of the loading conduit 23.

To add granular material to the silo, the lower input end 25 of the loading conduit is connected to an output pipe 43 of a pneumatic conveyor 45 and the pneumatic conveyor 45 transfers granular material from a transport vehicle 47 into the interior of the silo 3 through the loading conduit 23 while releasing air through a vent 23 in an upper portion of the silo 3, as schematically illustrated in FIG. 2.

When a desired quantity of granular material 7 has been transferred, the vent cover 29 is closed to close the vent opening 21 and prevent air movement into the upper portion of the silo 3 above the granular material 7, and the lower input end 25 of the loading conduit 23 is disconnected from the output pipe 43 of the pneumatic conveyor 45; and the output end 35 of the dust conduit 31 is connected to a lower portion of the loading conduit 23 and the lower input end 25 of the loading conduit 23 is sealed such that together the dust conduit 31 and loading conduit 23 form the vacuum conduit.

The present disclosure also provides a kit for collecting dust when removing granular material from a typical silo 3 as illustrated with a discharge opening 5 at a bottom portion thereof configured such that granular material 7 flows out through the discharge opening 5 to a target location 11, and with a loading conduit 23 mounted to the silo 3 with a lower input end 25 located at a lower location on an exterior of the silo 3 and an upper output end 27 located in an upper portion of an interior of the silo 3. The kit comprises a sealed housing 9 enclosing a flow path between the discharge opening 5 and the target location 5. The housing 9 can be provided by, for example, air impermeable plastic sheeting fastened over the discharge gate 17 and any discharge chute that may be present, to provide a sealed enclosure between the discharge gate and 5 and the output end 19 of the housing 9.

A dust conduit 31 is connected at an input end 33 thereof to an interior of the housing 9, and is configured at an output end thereof the same as a pneumatic conveyor output so same is readily connectable to the lower input end of the loading conduit. Vent covers may be required to close vent openings in an upper portion of the silo and prevent air movement into the upper portion of the silo if the existing silo does not already have such covers.

Figure 3:
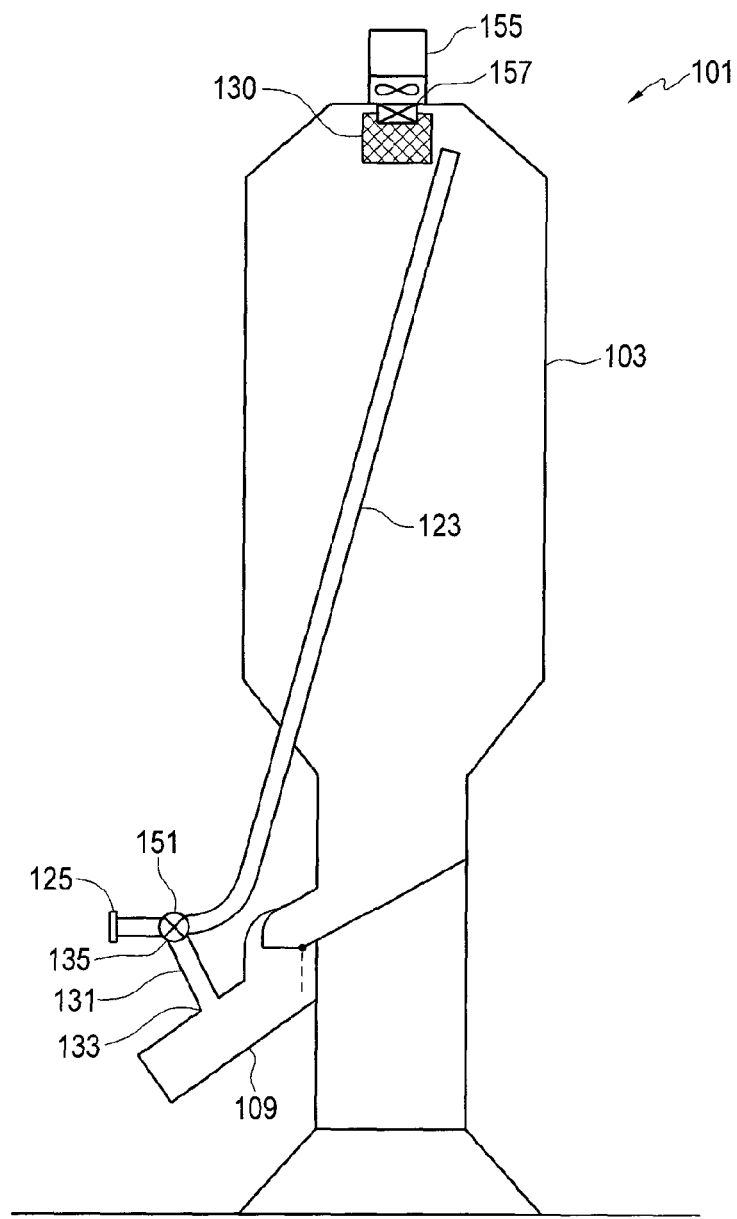
FIG. 3 is a schematic cut-away side view of a further embodiment of a granular material storage silo apparatus of the present disclosure.

FIG. 3 schematically illustrates an alternate embodiment of the granular material storage silo apparatus 101 of the present disclosure where the input end 133 of the dust conduit 131 is connected to the housing 109 and the output end 135 of the dust conduit 131 is connected to the lower portion of the loading conduit 123 through a valve mechanism 151 operative to selectively connect and disconnect the output end 135 of the dust conduit 131 and the lower portion of the loading conduit 123, and operative to correspondingly seal and open the lower input end 125 of the loading conduit 123.

Figure 4:
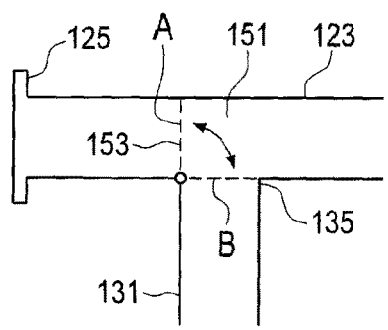
FIG. 4 is a schematic cut-away side view of the valve mechanism of the embodiment of FIG. 3.

The valve mechanism 151 is schematically illustrated in FIG. 4, with a flap 153 that moves from position A, where the output end 135 of the dust conduit 131 is connected to the loading conduit 123 and the lower input end 125 of the loading conduit 123 is sealed, to position B where the output end 135 of the dust conduit 131 is disconnected from the loading conduit 123, and closed to the loading conduit 123, and the lower input end 125 of the loading conduit 123 is open such that the pneumatic conveyor can be connected to transfer granular material into the silo 103.

Figure 5:
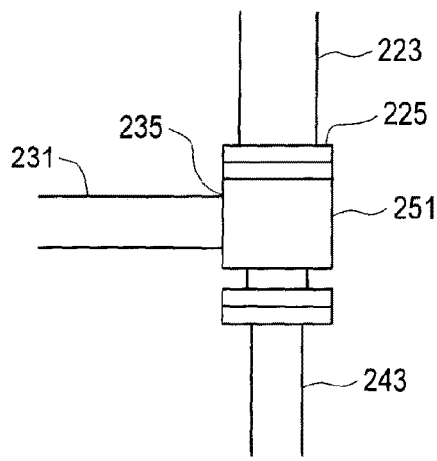
FIG. 5 is a schematic side view of a dust conduit with a valve mechanism on the output end thereof, the valve mechanism connected to the lower input end of the loading conduit, and to the output pipe of a pneumatic conveyor.

The kit of the present disclosure can conveniently include, as schematically illustrated in FIG. 5, a valve mechanism 251 on the output end 235 of the dust conduit 231 that is adapted to connect to the lower input end 225 of the loading conduit 223, and to connect to a pneumatic conveyor output pipe 243. The valve mechanism 251 operates in a manner the same as described above for valve mechanism 151, and is conveniently connects the dust conduit 231 of the kit to the loading conduit 223 of an existing silo.

The apparatus 101 further includes an exhaust fan 155 operative to draw air out of the upper portion of the interior of the silo 103. The illustrated fan 155 draws air out through a filter 130 and through a one-way check valve 157 that allows air to move out of the silo 103, but prevents air from moving into the silo 103, thus maintaining a sealed upper silo portion where a vacuum can be developed by granular material flowing out of the silo 103.

The present disclosure provides dust control using only the vacuum naturally created when granular material is drawn out of the silo to draw air and dust out of the housing enclosing the granular material flow and transfer the dust back into the silo through a vacuum conduit. It is common for granular material to be drawn out of such silos at rates between 200 and 500 cubic feet per minute, or more, requiring the replacement in the silo above the granular material therein of a similar rate of air, thus creating an air stream sufficient to draw dust out of the sealed housing. The air stream flow can be increased by adding an exhaust fan to draw more air out of the silo above the granular material. The loading conduit commonly installed on such granular material storage silos can be utilized to form a large part of the required vacuum conduit.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A granular material storage silo apparatus comprising:
  a silo with a discharge opening at a bottom portion thereof wherein the silo and discharge opening are configured such that granular material flows by gravity out through the discharge opening and through a sealed housing to a target location;
  a vent opening in a top portion of the silo, and a vent cover operative to selectively open and close the vent opening, and wherein when the vent cover is closed, air movement into an upper portion of the silo through the vent opening is prevented;
  a gate operative to control a flow of granular material through the discharge opening;
  a vacuum conduit with a lower input end thereof connected to an interior of the housing, and an upper output end thereof located in an upper portion of an interior of the silo;
  wherein as granular material flows out of the silo, a vacuum is created in the upper portion of the silo above granular material stored in the silo, and wherein the sealed housing is configured such that when the vacuum is created in the upper portion of the silo, air enters the sealed housing only though an output end of the sealed housing located at the target location such that air and dust is drawn from the sealed housing through the vacuum conduit into the silo; and a loading conduit with a lower input end located at a lower location on an exterior of the silo and configured to be attached to a pneumatic conveyor output, and an upper output end located in the upper portion of the interior of the silo, and a dust conduit connected at an input end thereof to an interior of the housing and connectable at an output end thereof to the lower input end of the loading conduit, and wherein the vacuum conduit is provided by connecting the output end of the dust conduit to the lower input end of the loading conduit and sealing the lower input end of the loading conduit, wherein the output end of the dust conduit is connected to the lower input end of the loading conduit through a valve mechanism operative to selectively connect and disconnect the output end of the dust conduit and the lower portion of the loading conduit, and operative to correspondingly seal and open the lower input end of the loading conduit.

2. The apparatus of claim 1 wherein the output end of the dust conduit is connectable to the lower input end of the loading conduit such that the lower input end of the loading conduit is sealed by the output end of the dust conduit.

3. The apparatus of claim 1 wherein the housing includes a flexible portion at an output end thereof.

4. The apparatus of claim 1 further comprising an exhaust fan operative to draw air out of the upper portion of the interior of the silo.

5. The apparatus of claim 4 wherein the exhaust fan draws air out of the upper portion of the interior of the silo through a filter.

6. The apparatus of claim 1 wherein the housing has a floor sloped such that the granular material flows along the sloped floor, and wherein the lower input end of the vacuum conduit is connected to the interior of the housing at a location above granular material flowing along the sloped floor.

* * * * *

UNITED STATES PATENT AND TRADEMARK OFFICE
CERTIFICATE OF CORRECTION

| | |
|---|---|
| PATENT NO. | : 10,301,108 B2 |
| APPLICATION NO. | : 15/034697 |
| DATED | : May 28, 2019 |
| INVENTOR(S) | : Alvin Herman and Erin Herman |

It is certified that error appears in the above-identified patent and that said Letters Patent is hereby corrected as shown below:

On the Title Page

Item (22), please delete, "November 11, 2014" as the filing date for PCT/CA14/00811. The correct filing date is November 10, 2014.

Signed and Sealed this
Ninth Day of July, 2019

Andrei Iancu
*Director of the United States Patent and Trademark Office*